(12) United States Patent
Pini

(10) Patent No.: US 7,563,985 B2
(45) Date of Patent: Jul. 21, 2009

(54) GEL-FILLED CASING FOR ELECTRIC CONNECTIONS

(76) Inventor: Belisario Pini, Via U. Corsi 26, Firenze (IT)

( * ) Notice: Subject to any disclaimer, the term of this patent is extended or adjusted under 35 U.S.C. 154(b) by 0 days.

(21) Appl. No.: 12/037,244

(22) Filed: Feb. 26, 2008

(65) Prior Publication Data

US 2008/0142261 A1 Jun. 19, 2008

Related U.S. Application Data

(62) Division of application No. 11/463,419, filed on Aug. 9, 2006, now Pat. No. 7,417,190.

(30) Foreign Application Priority Data

Aug. 31, 2005 (IT) .............................. FI2005A0185

(51) Int. Cl.
*H01R 4/00* (2006.01)
*H02G 3/06* (2006.01)
*H02G 15/08* (2006.01)

(52) U.S. Cl. .................. 174/92; 439/521; 439/936; 174/76

(58) Field of Classification Search ............... 174/76, 174/92, 88 R, 797, 59; 439/521, 936
See application file for complete search history.

(56) References Cited

U.S. PATENT DOCUMENTS

| 4,859,809 | A | 8/1989 | Jervis |
| 5,397,859 | A | 3/1995 | Robertson et al. |
| 5,828,005 | A | 10/1998 | Huynh-Ba et al. |
| 6,265,665 | B1 | 7/2001 | Zahnen |
| 6,333,463 | B1 * | 12/2001 | Bukovnik et al. ......... 174/77 R |

FOREIGN PATENT DOCUMENTS

| EP | 0 443 694 A1 | 8/1991 |
| EP | 1 865 585 A2 | 12/2007 |

* cited by examiner

*Primary Examiner*—Javaid Nasri
(74) *Attorney, Agent, or Firm*—McGlew and Tuttle, P.C.

(57) ABSTRACT

Gel-filled casing for electric connections comprising a base element (100; 200) having an internal volume filled with dielectric gel (G) and a covering or upper element (102; 201) which can be reciprocally coupled in a reversible or irreversible manner to the base element (100, 200), delimiting an internal cavity (101; 210) for a terminal box (3) or similar device to which one or more cables (5) are connected, wherein a plurality of in/out tubular guides for the cables (5) are formed on the covering or upper element (102; 201).

5 Claims, 7 Drawing Sheets

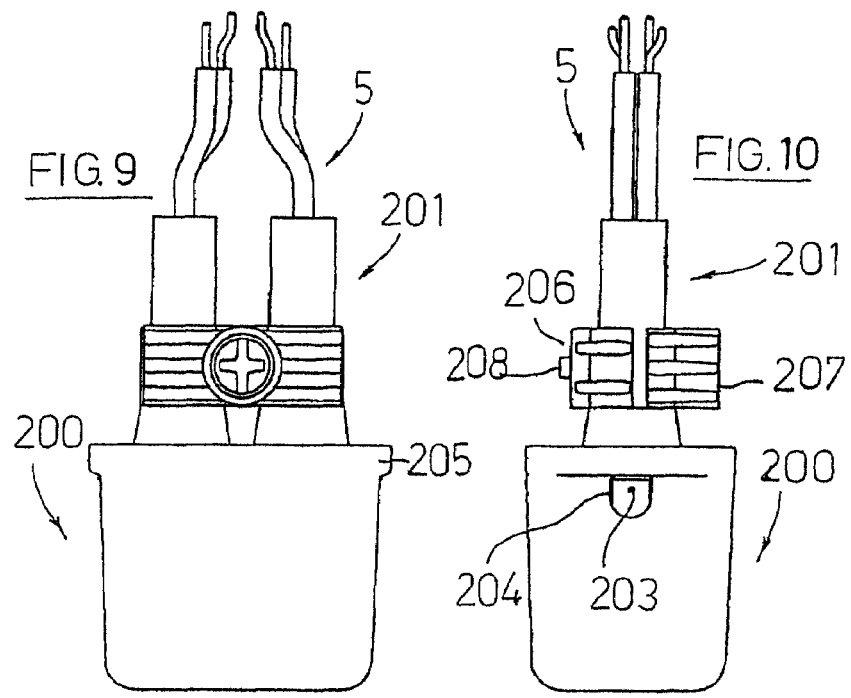
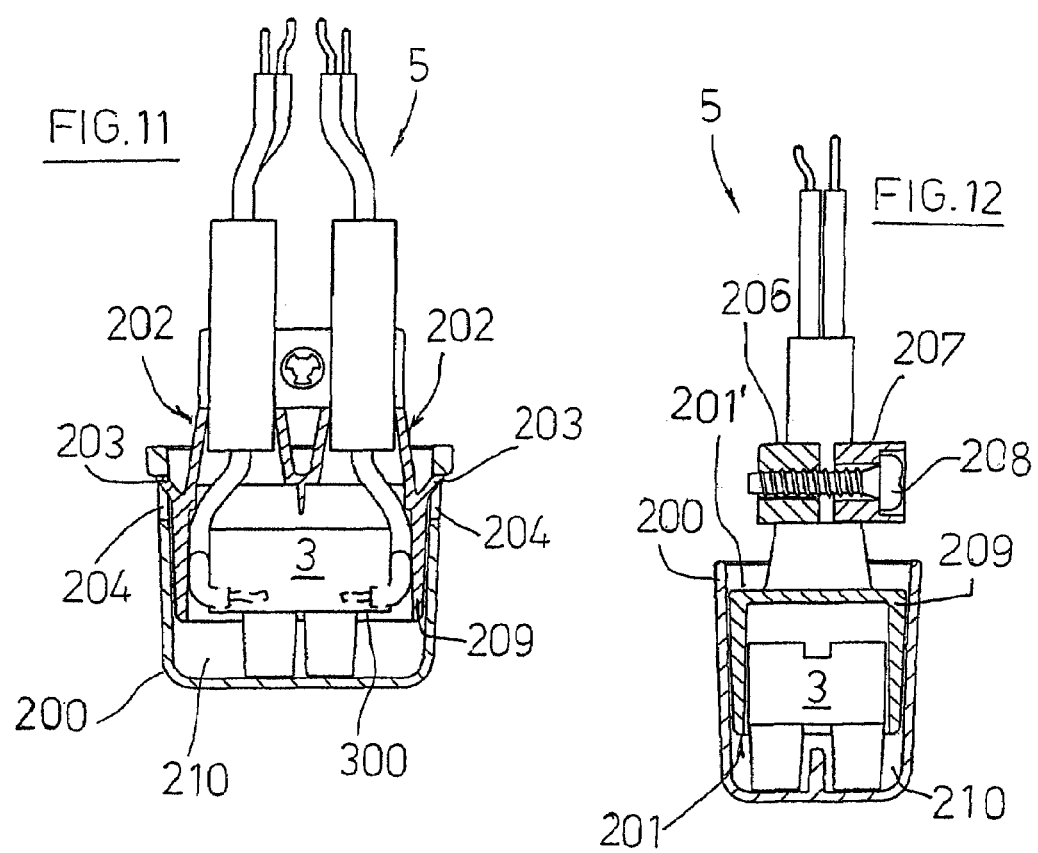

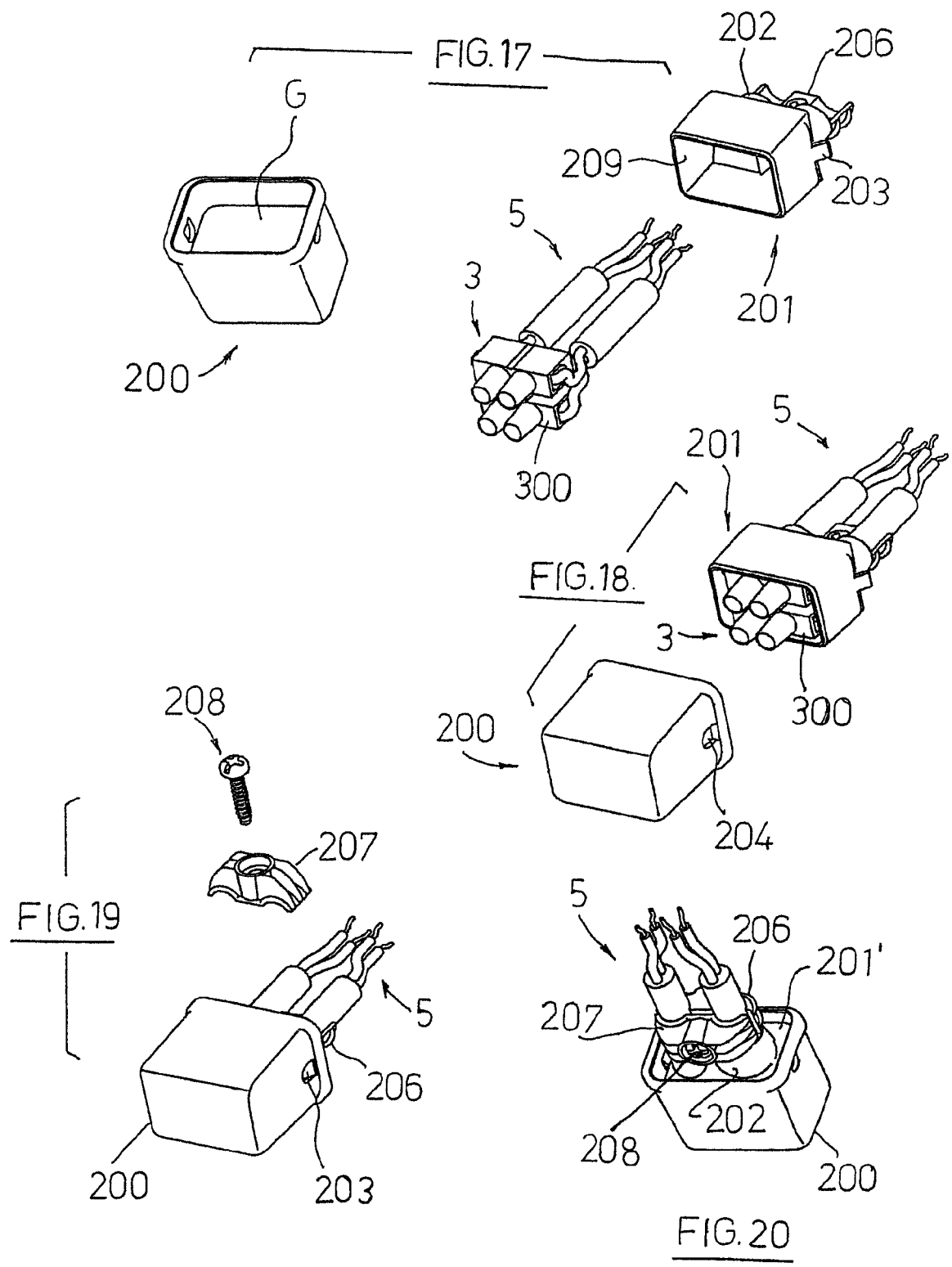

GEL-FILLED CASING FOR ELECTRIC CONNECTIONS

CROSS REFERENCE TO RELATED APPLICATIONS

This application is a divisional under 37 CFR 1.53(b) of prior application Ser. No. 11/463,419 filed Aug. 9, 2006 now U.S. Pat. No. 7,417,190 and claims the benefit under 35 U.S.C. § 119 of Italian Application FI2005A000185 of Aug. 31, 2005. The entire contents of each application is hereby incorporated by referency in its entirety.

FIELD OF THE INVENTION

The present invention relates to a gel-filled casing for electric connections.

BACKGROUND OF THE INVENTION

Casings for electric connections are known from EP443694, U.S. Pat. No. 5,828,005, U.S. Pat. No. 6,265,665, U.S. Pat. No. 5,397,859 and U.S. Pat. No. 4,859,809. These documents disclose a casing for electric connections comprising two elements which can be reciprocally coupled in a reversible or irreversible manner and delimiting an internal cavity for a terminal box or similar device and a plurality of in/out openings for one or more cables which can be connected to the terminal box or similar device. The internal space of at least one of said two elements is filled with dielectric gel which occupies said space before the positioning of the terminal box or similar device into said cavity, that is to say it is provided with a predetermined quantity of dielectric gel which occupies its internal space.

SUMMARY OF THE INVENTION

The present invention aims at simplifying the execution of junctions or connections of electric cables protected by the action of liquid substances or vapors in order to render them more efficient, safer and easier to execute.

According to the present invention, these results have been achieved by providing a casing whose features are indicated in claim 1. Further features of the present invention are the subject of the dependent claims.

The present invention makes it possible to realize a water and vapor tight casing for electric connections which is very simple, safe, efficient and reliable, even after long periods in environments characterized by the presence of liquids and vapors and, at the same time, it ensures reduced manufacturing costs and is easy to use.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention is illustrated.

BRIEF DESCRIPTION OF THE DRAWINGS

In the drawings:

FIG. 9 is a front view of a casing according to yet another embodiment of the present invention;

FIG. 10 is a side view of the casing shown in FIG. 9;

FIG. 11 is a vertical section view of the casing shown in FIG. 9;

FIG. 12 is a vertical section view of the casing shown in FIG. 10;

FIG. 17 is an exploded view of the casing shown in FIG. 9;

FIG. 18 is an exploded view of the casing shown in FIG. 9;

FIG. 19 is an exploded view of the casing shown in FIG. 9; and

FIG. 20 is a perspective view of assembled casing shown in FIG. 9.

DESCRIPTION OF THE PREFERRED EMBODIMENT

Figure 1:
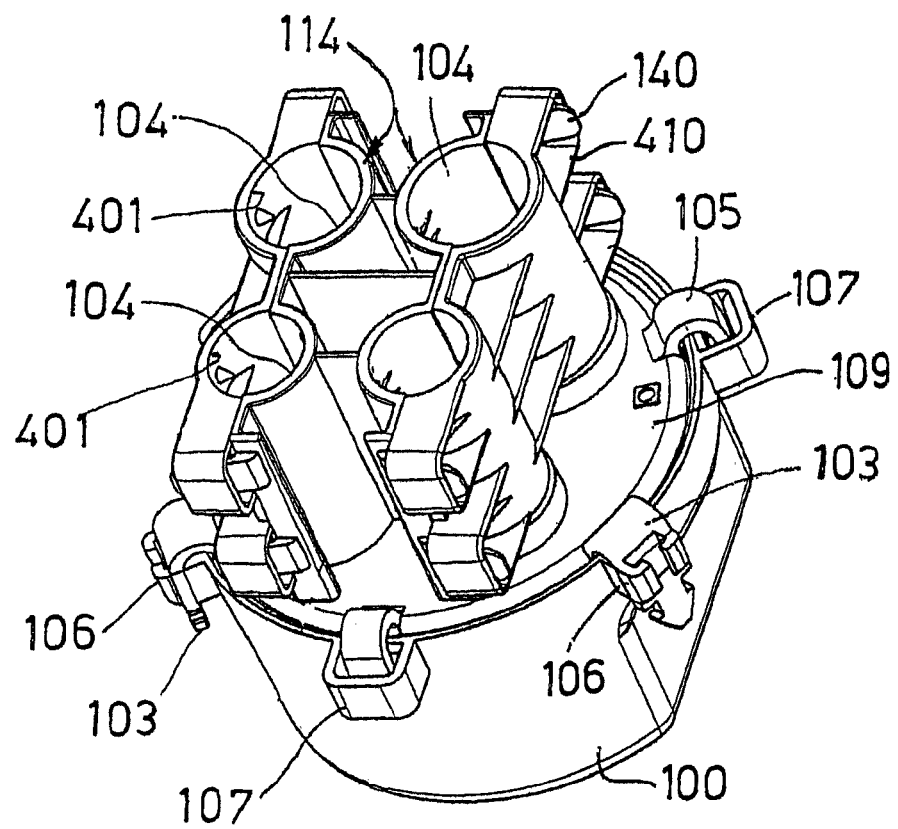
FIG. 1 is a perspective view of a casing for electric connections according to an embodiment of the present invention.
Figure 4:
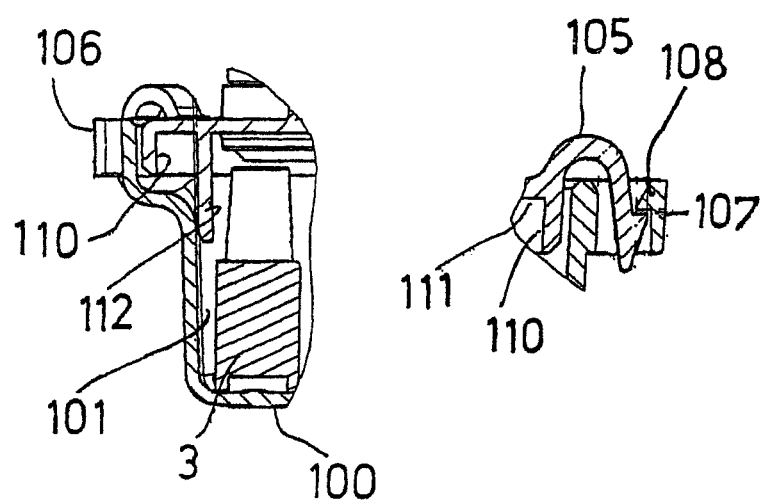
FIG. 4 is partial transverse section view of the base element of the casing shown in FIG. 1.
Figure 3:
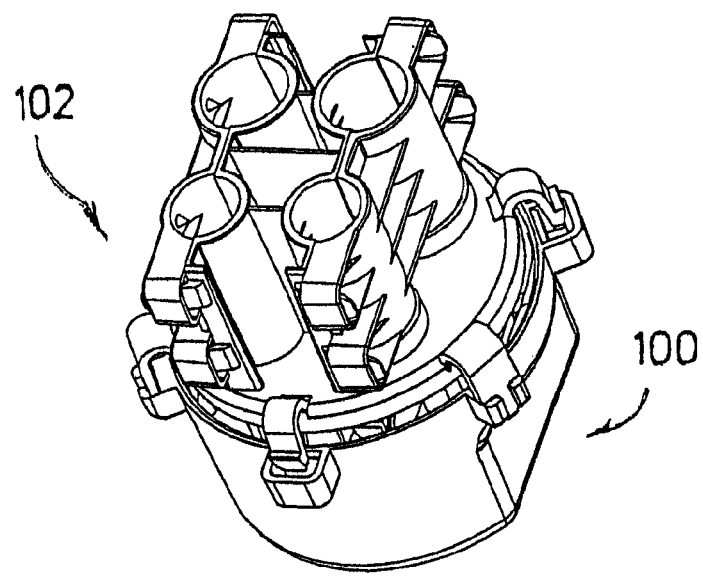
FIG. 3 is a perspective view of the casing shown in FIG. 1 in a step preceding the coupling of the upper element to the base element.
Figure 2:
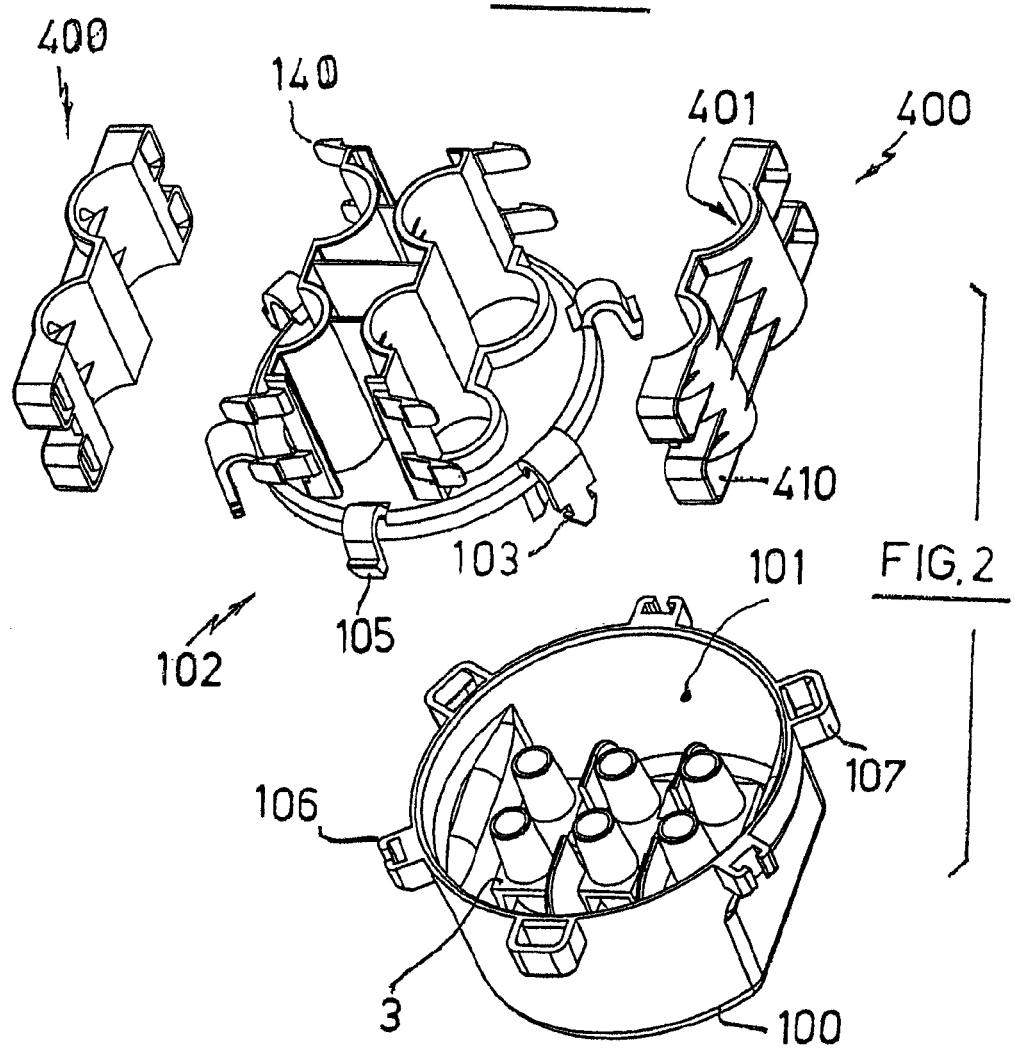
FIG. 2 is an exploded perspective view of the casing of FIG. 1.
Figure 5:
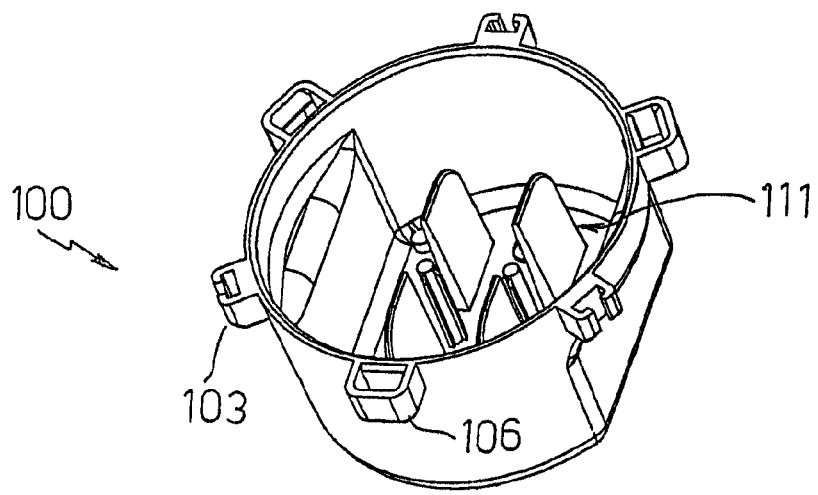
FIG. 5 is a perspective view of the base element of the casing shown in FIG. 1.
Figure 8:
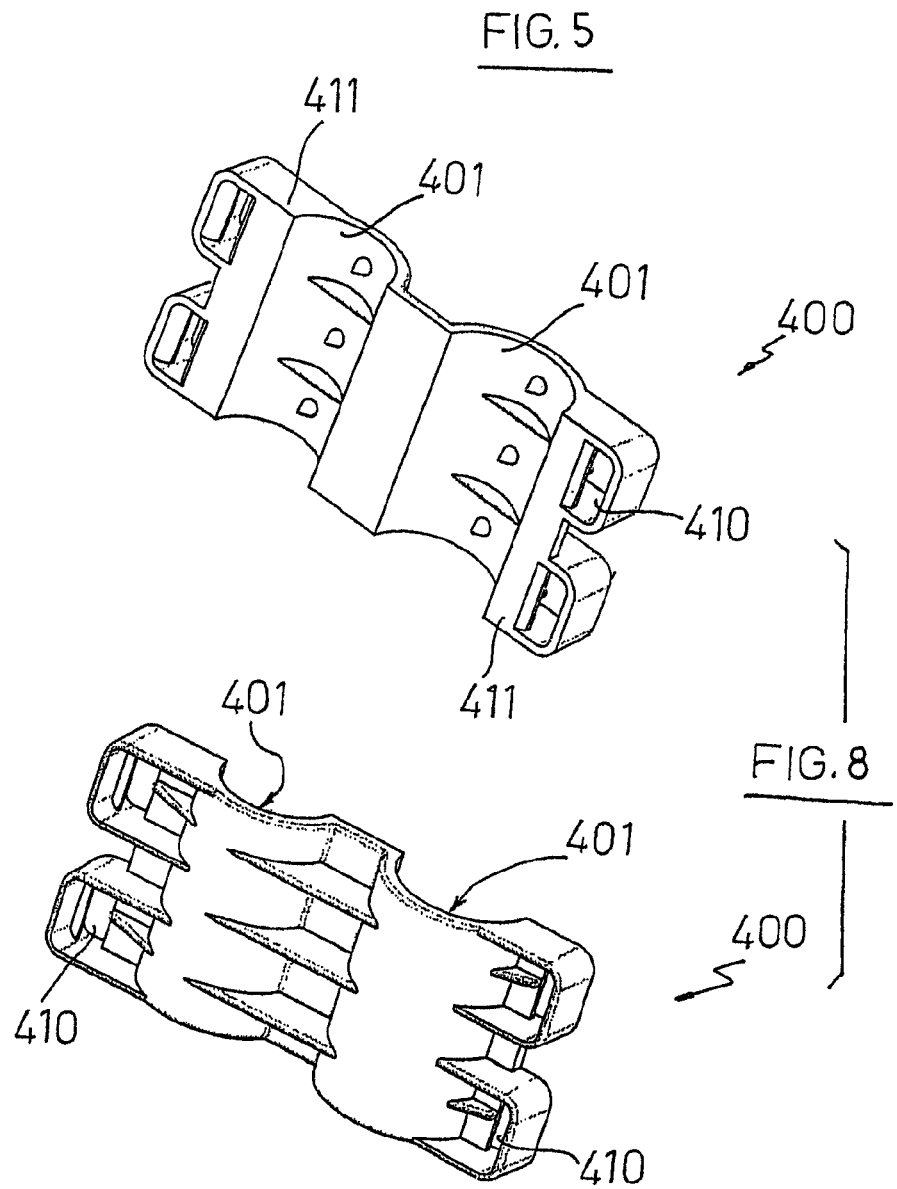
FIG. 8 is a perspective view of the cables clamping elements associated with the upper element of the casing shown in FIG. 1.
Figure 6:
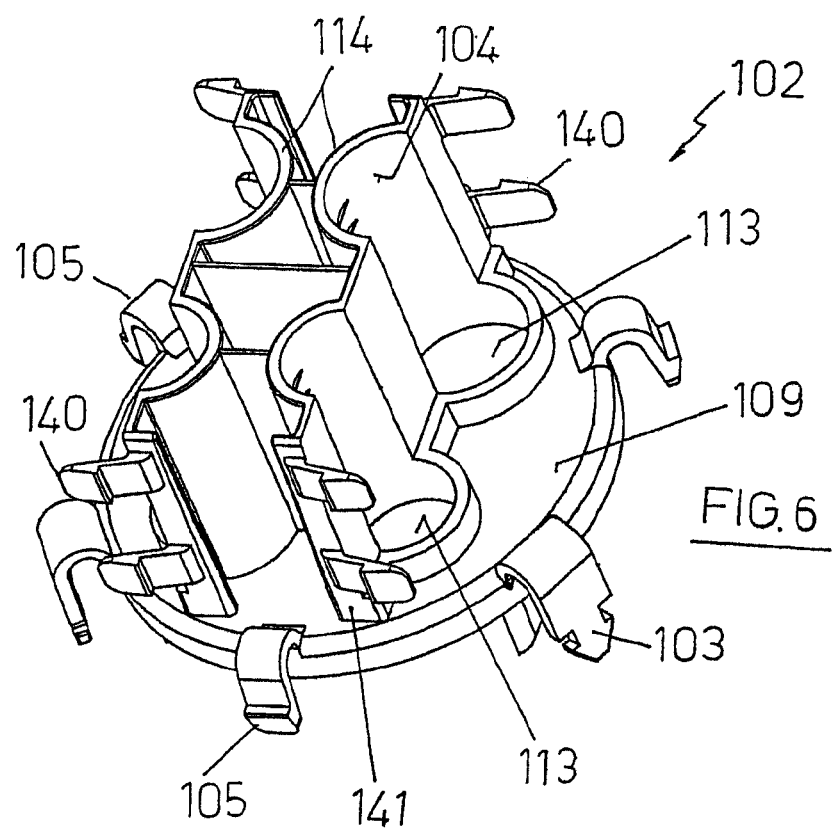
FIG. 6 is a perspective top view of the upper element of the casing shown in FIG. 1.
Figure 7:
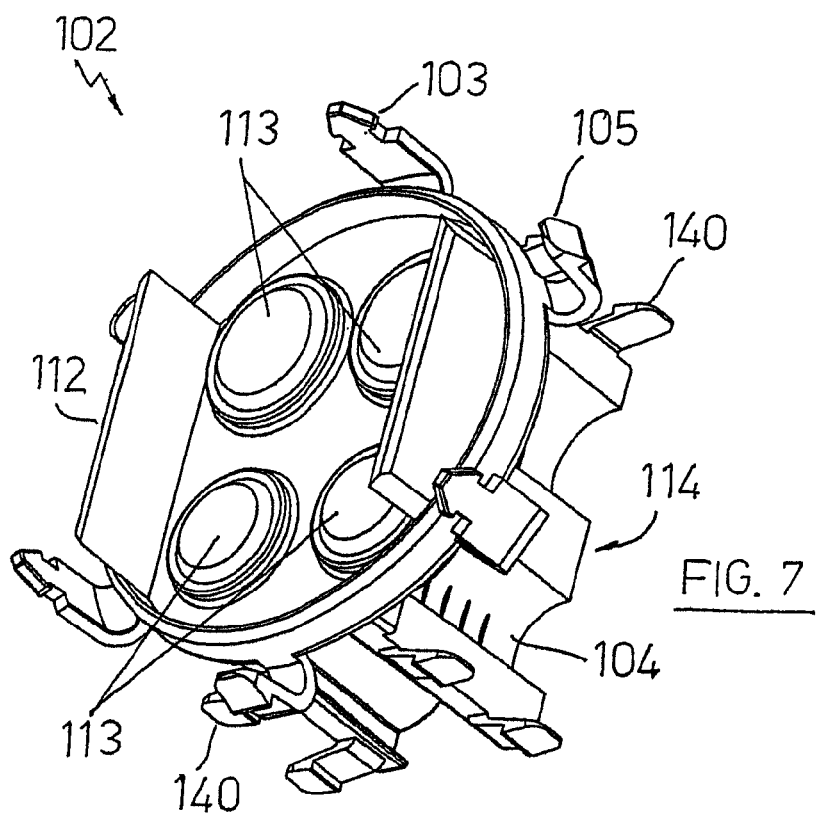
FIG. 7 is a perspective bottom view of the upper element of the casing shown in FIG. 1.

Referring to the drawings in particular FIGS. 1-8, the casing subject of the present invention comprises a base body (100) with an internal housing (101) for a terminal box (3) or similar device and an upper element (102) which constitutes a cover element of said housing (101) and is provided with a plurality of extensions (114) orthogonal to its upper face. Said extensions (114) are provided with channel-shaped depressions (104). Said depressions, in cooperation with corresponding depressions featured by the element (400) described below, delimit corresponding tubular guides for the cables connected to the terminal box (3). The internal bottom of base element (101) features a plurality of extensions (111) which emerge perpendicularly from the bottom itself and act as guides for the positioning of the terminal box (3). Said elements (100) and (102) are provided with means for their reciprocal coupling. In particular, said coupling means consist of a first series of flexible tongues (103) having the shape of a reversed "J" whose base is in proximity to a peripheral edge of the upper or external face of the element (102) and of a second series of flexible tongues (105) having the shape of a reversed "J" with a hooked free end, the base thereof being in proximity to the edge of element (102) from which the tongues (103) of the first series emerge. Moreover, said coupling means comprise a first and of a second series of eyelets (106, 107) with vertical openings provided by the base element (100) in proximity to the upper edge of its external wall. The tongues (103) of the first series of tongues are inserted in the eyelets (106) of the first series of eyelets and the tongues (105) of the second series of tongues are inserted in the eyelets (107) of the second series of eyelets. Each eyelet (107) of the second series of eyelets features a surface (108) which partially develops inside the eyelet itself and constitutes a guide element for the hooked part of corresponding tongue (105). A lower horizontal portion of said surface (108) constitutes a contrast element for said hooked part of tongue (105) and a holding element of the tongue itself when the device is assembled.

The element (102) features an edge (110) having a predetermined height on its internal face (111), that is to say on the face which is opposite to the face (109) from which tongues (103) and (105) emerge. The face (111) of the element (102) is provided with two diametrically opposed flat extensions (112), which are orthogonal to the surface of the face (111) from which they emerge. Said extensions (112) are positioned more internally and are longer than said edge (110).

Both faces (109, 111) of element (102) are provided with a plurality of removable portions (113) in correspondence of the above mentioned extensions (114). The removal of one or more said removable portions (113)—this operation can be carried out by means of a tool such as a screwdriver or similar tool—provides corresponding in/out openings for the cables connected to the terminal box (3).

Corresponding complementary elements (400) are hooked on said extensions (114) and each of them features channel-shaped cavities (401) corresponding to those (104) provided by extensions (114). In the example illustrated in FIGS. 22-30, said extensions (114) are four. Accordingly, each complementary element consists of a body with two hollow section cavities (401) positioned side by side, each of them being positioned in front of a corresponding extension (114) of element (102) when the casing is assembled. The connection of elements (400) to extensions (114) of element (102), so as to allow each cavity (104) of extensions (114) to be positioned opposite to a corresponding cavity (401) of an element (400), provides the above mentioned in/out tubular guides for the cables connected to terminal box (3).

Said extensions (114) of element (102) and complementary elements (400) are provided with means for their reciprocal coupling. Said means comprise a plurality of hooked tongues (140) which orthogonally project from the two longitudinal external edges (141) of said extensions (114) and a plurality of corresponding eyelets (410) featured by each element (400) at its external longitudinal edges (411). The coupling is carried out by introducing each tongue (140) into the corresponding eyelet (410).

The base element (100) is filled with dielectric gel. The positioning of terminal box (3) inside cavity (101) filled with gel and the subsequent coupling of element (102) to base (100) determines a flow of gel which covers the whole terminal box, that is to say the connections between the terminal box and the cables which are joined to it, and penetrates the in/out guides of the cables so as to render the connections perfectly sealed.

For example, dielectric gel (G) can be of the Dow Corning Q3-6575 type, that is to say of the bi-component type which slowly polymerizes at ambient temperature or of the bi-component type which fast polymerizes at high temperatures.

Preferably, gel (G) is of the hot polymerized type, polymerizing at a temperature of 100° C.

Figure 13:
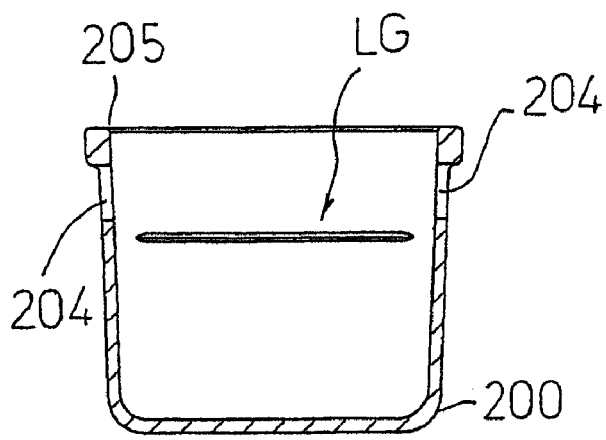
FIG. 13 is a vertical section view of the base element of the casing shown in FIG. 9.
Figure 15:
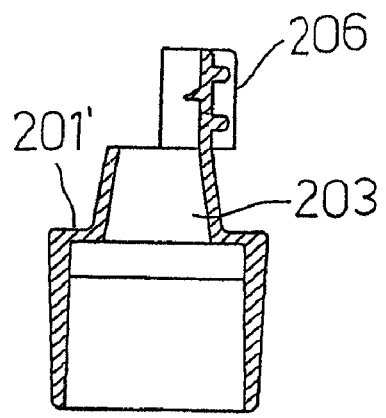
FIG. 15 is a vertical section view of the element shown in FIG. 14.
Figure 16:
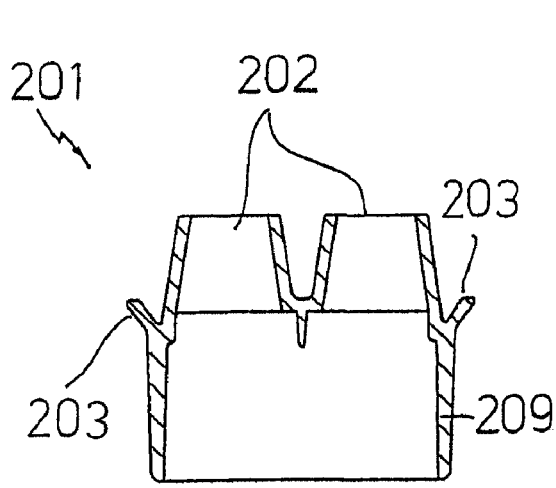
FIG. 16 is a vertical section view of the element shown in FIG. 14.
Figure 14:
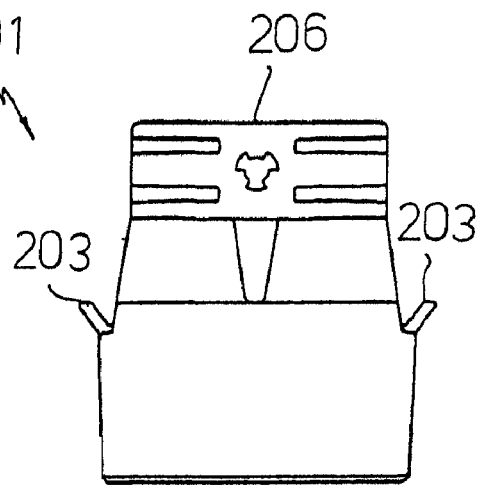
FIG. 14 is a front view of the upper element of the casing shown in FIG. 9.

Reference being made to the example shown in FIGS. 9-20, a casing for electric connections according to the present invention comprises a base element (200) and an upper element or cover (201). The base (200) accommodates the terminal box (3) to which the cables (5) are connected and is filled with dielectric gel (G) up to a predetermined level (LG). The cover element (201) is provided, on its top surface (201'), with a plurality of funnel-shaped in/out openings (202) for the passage of the cables (5), the larger base of said openings (202) being oriented towards the internal bottom of the base (200) when the casing is assembled. Moreover, the cover element (201) is provided with a diagonally and upwardly, i.e. centrifugally, oriented fin (203) on both external sides, said fins (203) being located in proximity of the lower end of said openings (202). The free end of each fin (203) is intended to engage a corresponding hole (204) provided by the base element (200) in proximity of its top edge (205). The fins (203) make it possible to realize an irreversible coupling of the cover element (201) to the base (200). The cover element (201) is provided with side walls (209) developing below said fins (203) and intended to be positioned within the cavity (210) delimited by the side walls and the bottom of the base element (200). The cover element (201) is further provided, positioned on top and laterally of said funnel-shaped openings (202), with an appendix (206) cooperating with a detachable complementary element (207) to clamp the cables (5) exiting from the openings (202) once, as further described below, the casing assembling is completed.

This casing is assembled as shown in FIGS. 17-20. First, the cables (5) connected to the terminal box (3) are inserted through the openings (202) of the cover element (201) and the terminal box is housed within the space delimited by the side walls (209) of the cover element (201), the top surface (300) of the terminal box (3) being oriented towards the external. Then, the side walls (209) of the cover (201) are inserted into the base element (200) which is pre-filled with the dielectric gel (G) up to the engagement of the fins (203) of the cover (201) into the openings (204) of the base (200). During said insertion, the dielectric gel flows through any available space and completely seals the electric connections. The terminal box (3) results positioned with its top surface (300) oriented towards the internal bottom of the base element (200). Finally, the cables (5) exiting from the openings (202) of the cover element (201) are clamped by said appendix (206) and said complementary element (207) which are joined together, on opposite sides with respect to the cables (5), by means of a screw (208).

Practically, all the construction details may vary in any equivalent way as far as the shape, dimensions, elements disposition, nature of the used materials are concerned, without nevertheless departing from the scope of the adopted solution idea and, thereby, remaining within the limits of the protection granted to the present patent.

While specific embodiments of the invention have been shown and described in detail to illustrate the application of the principles of the invention, it will be understood that the invention may be embodied otherwise without departing from such principles.

What is claimed is:

1. A gel-filled casing for electric connections, comprising: a base element having an internal volume filled with dielectric gel and a covering or upper element which can be reciprocally coupled in a reversible or irreversible manner to the base element, said base element defining an internal cavity for a terminal box or similar device to which one or more cables are connected, wherein a plurality of in/out tubular guides for said cables are formed on said covering or upper element, said base element being filled with dielectric gel up to a predetermined level, said covering or upper element having a top surface, said top surface having a plurality of funnel-shaped in/out openings for the passage of the cables, one opening having a size at one end thereof that is greater than a size at another end thereof, wherein the end of said opening with said greater size is oriented towards an internal bottom surface of the base element when said base element is connected to said covering or upper element.

2. A gel-filled casing for electric connections according to claim 1, wherein said base element and said covering or upper element have a means for reciprocal coupling.

3. A gel-filled casing for electric connections, comprising: a base element having an internal volume filled with dielectric gel and a covering or upper element which can be reciprocally coupled in a reversible or irreversible manner to the base element, said base element defining an internal cavity for a terminal box or similar device to which one or more cables are connected, wherein a plurality of in/out tubular guides for said cables are formed on said covering or upper element, said base element being filled with dielectric gel up to a predetermined level, said covering or upper element having a top surface, said top surface having a plurality of funnel-shaped in/out openings for the passage of the cables, one opening having a size at one end thereof that is greater than a size at another end thereof, wherein the end of said opening with said greater size is oriented towards an internal bottom surface of the base element when said base element is connected to said covering or upper element, said covering or upper element having a diagonally and upwardly or centrifugally oriented fin on one external side and on another external side, each fin being located in proximity of a lower end of said openings, each fin having a free end, said free end engaging a corresponding hole in said base element in proximity of a top edge of said base element, said fins irreversibly coupling the cover element to the base.

4. A gel-filled casing for electric connections, comprising: a base element having an internal volume filled with dielectric gel and a covering or upper element which can be reciprocally coupled in a reversible or irreversible manner to the base element, said base element defining an internal cavity for a terminal box or similar device to which one or more cables are connected, wherein a plurality of in/out tubular guides for said cables are formed on said covering or upper element, said base element being filled with dielectric gel up to a predetermined level, said covering or upper element having a top surface, said top surface having a plurality of funnel-shaped in/out openings for the passage of the cables, one opening having a size at one end thereof that is greater than a size at another end thereof, wherein the end of said opening with said greater size is oriented towards an internal bottom surface of the base element when said base element is connected to said covering or upper element, said covering or upper element having a diagonally and upwardly or centrifugally oriented fin on one external side and on another external side, each fin being located in proximity of a lower end of said openings, each fin having a free end, said free end engaging a corresponding hole in said base element in proximity of a top edge of said base element, said fins irreversibly coupling the cover element to the base, said cover element having side walls extending below said fins, said side walls being positioned within the cavity, said cavity being delimited by said side walls and a bottom of said base element.

5. A gel-filled casing for electric connections, comprising: a base element having an internal volume filled with dielectric gel and a covering or upper element which can be reciprocally coupled in a reversible or irreversible manner to the base element, said base element defining an internal cavity for a terminal box or similar device to which one or more cables are connected, wherein a plurality of in/out tubular guides for said cables are formed on said covering or upper element, said base element being filled with dielectric gel up to a predetermined level, said covering or upper element having a top surface, said top surface having a plurality of funnel-shaped in/out openings for the passage of the cables, one opening having a size at one end thereof that is greater than a size at another end thereof, wherein the end of said opening with said greater size is oriented towards an internal bottom surface of the base element when said base element is connected to said covering or upper element, said covering or upper element having an appendix cooperating with a detachable complementary element to clamp the cables extending from said openings, said appendix and said complementary element being positioned on top and laterally of said funnel-shaped openings.

* * * * *